United States Patent [19]

Matsuyama et al.

[11] Patent Number: 5,154,786
[45] Date of Patent: Oct. 13, 1992

[54] METHOD OF MANUFACTURING AN ENDLESS TAPE

[75] Inventors: Masayoshi Matsuyama, Tokyo; Yoshihiko Miyasaka, Kanagawa, both of Japan

[73] Assignee: Sony Magnescale Inc., Japan

[21] Appl. No.: 677,085

[22] Filed: Mar. 29, 1991

[30] Foreign Application Priority Data

Mar. 30, 1990 [JP] Japan .................................. 2-84486

[51] Int. Cl.⁵ .............................................. B32B 31/18
[52] U.S. Cl. .................................... 156/157; 156/159; 156/258; 156/304.3; 156/502; 156/505; 156/506; 242/56 R; 242/58.1; 242/58.4; 242/58.5
[58] Field of Search ............ 156/157, 159, 258, 304.3, 156/502, 505, 506; 242/56 R, 58.1, 58.4, 58.5

[56] References Cited

U.S. PATENT DOCUMENTS

| | | | |
|---|---|---|---|
| 3,554,842 | 1/1971 | Byrt | 156/505 |
| 4,174,247 | 11/1979 | Dyck | 156/506 |
| 4,563,234 | 1/1986 | Kubo | 156/159 |
| 5,066,347 | 11/1991 | Yoshida | 156/505 |

FOREIGN PATENT DOCUMENTS

| | | | |
|---|---|---|---|
| 78815 | 5/1984 | Japan | 156/258 |
| 64-17222 | 1/1989 | Japan . | |

Primary Examiner—Caleb Weston
Attorney, Agent, or Firm—Ronald P. Kananen

[57] ABSTRACT

A length of tape is drawn off a reel, passed over the cutting/connecting section of a splicer, passed through a temporary storage vessel and looped back so as to pass over the cutting/connecting section again. The free end is connected to a take up reel. Tape clamps bring the overlapping layers of tape down onto the cutting/connecting section and are then cut. One of the tape clamps is withdrawn while an applicator applies a piece of adheseive tape in a manner which splices a continuous loop of tape.

2 Claims, 2 Drawing Sheets

METHOD OF MANUFACTURING AN ENDLESS TAPE

BACKGROUND OF THE INVENTION

1. Field of the Invention

The present invention relates to an automatic method for producing an endless tape such as that used in connection with repetitious announcements, visual displays and the like.

2. Description of the Prior Art

In order to produce an endless tape for use in announcing machines and the like type of audio and video reproducing devices, it is common for an operator to manually take the leading and trailing ends of a given length of tape and connect the same together. However, this particular technique encounters the drawbacks that the production is relatively difficult and the precision with the connection of the ends is made is less than desired. That it to say, this manual technique results in the ends being offset either a little to the left or the right. Further, the unusable portion which results from the joining operation is apt to cause damage to the remaining portion of the tape.

In order to overcome these problems an arrangement via which an endless tape could be produced automatically has been proposed in JP-A-64-17222. However, this arrangement includes the use of a leader tap tape and the like and is extremely complicated.

SUMMARY OF THE INVENTION

It is an object of the present invention to provide a relatively simple technique via which an endless tape can be automatically be cut and connected.

In brief, the above object is achieved by an arrangement wherein a length of tape is drawn off a reel, passed over the cutting/connecting section of a splicer, passed through a temporary storage vessel and looped back so as to pass over the cutting/connecting section again. The free end is connected to a take up reel. Tape clamps bring the overlapping layers of tape down onto the cutting/connecting section and are then cut. One of the tape clamps is withdrawn while an applicator applies a piece of adhesive tape in a manner which splices a continuous loop of tape.

More specifically, a first aspect of the present comes in a method of forming an endless tape which features the steps of: arranging a length of tape which is supplied from a supported tape reel, so that it passes over a cutting/connecting section of a splicing device, through a container having an inlet and an outlet, back over the cutting/connecting section of the splicing device, and leads to a take-up reel, said length of tape including a given length of superfluous tape and a predetermined length is to be used for recording purposes and which is defined between an initial portion and an end portion, one end of the superfluous length being connected to the take-up reel, securing two layers of a tape length on a connecting/cutting section so that the initial portion is in the upper layer and is located to one side of the cutting/connecting section and the end portion is in the lower layer and is located to the other side of the cutting/connecting section; cutting the two layers of tape at a location between the initial and end portions; and splicing the initial and end portions to define a continuous tape which is essentially free of superfluous tape length.

A second aspect of the present invention comes in a method of forming an endless tape which features the steps of: drawing a length of tape off a rotatably supported reel; passing the tape over a cutting/connecting section of a splicer, through a temporary storage vessel and looping the tape back so as to pass over the cutting/connecting section once more; connecting the free end of the tape to a take-up reel; clamping the two layers of tape on the cutting/connecting section using first and second tape clamps and cutting the same using a cutter; and withdrawing one of the first and second tape clamps and applying a piece of adhesive tape in a manner which splices a continuous loop of tape.

A further aspect of the present invention comes in an apparatus for forming a continuous loop of tape, which features: a rotatably supported tape reel; a cutting/connecting section which forms part of a tape splicer, the cutting/connecting section including a cutter; a housing in which tape can be temporarily stored; first and second tape clamps which form part of the tape splicer and which can be selectively lowered onto the cutting/connecting section, the first and second tape clamps being associated with a source of vacuum and arranged to clamp the tape by creating a pressure differential across the tape, the first and second tape clamps being individually and independently movable; an applicator which applies adhesive to the tape and which connects the ends thereof; and a take-up reel onto which a cut-off portion of the tape reel can be wound.

DETAILED DESCRIPTION OF THE PREFERRED EMBODIMENT

Figure 1:
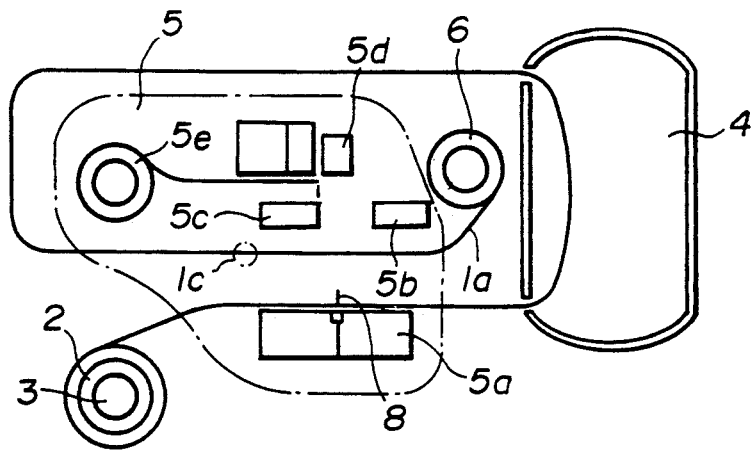
FIGS. 1 to 6 are schematic drawings which illustrate the steps which characterize an embodiment of the present invention.

In the figures, the numeral 1 denotes a tape having a superfluous portion 1a, the numeral 2 a tape reel which is rotatably supported on a base or stand 3, the numeral 4 a hopper or container in which the tape can be introduced and temporarily stored during the endless tape formation process, and which has an inlet and an outlet, the numeral 5 a splicer including means for cutting and connecting tape, and the numeral 6 a take up reel on which tape can be wound practice the process.

The above mentioned splicer 5 further includes a cutting/connecting section 5a, tape clamps 5b, 5c which can be selectively moved as required, a reel of adhesive tape 5e from which a small pieces of adhesive tape can be cut and selectively applied by an adhesive applicator 5d.

In this embodiment, the tape clamps 5b, 5c include, or are operatively connected with, a source of vacuum, and arranged to use pressure differential to pick up and hold tape thereagainst as required.

A cutter 8 is included in the connecting section 5a and arranged to be moved in a manner which severs the tape which is clamped on the upper surface of the connecting section 5a.

Although not shown for simplicity, the various elements of the above described apparatus are connected with servos/motors which are in turn controlled in accordance with a predetermined control program.

Figure 2:
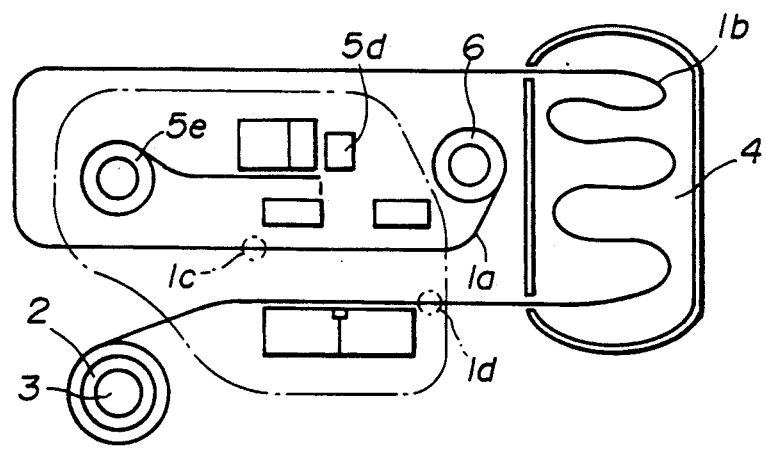
Figure 3:
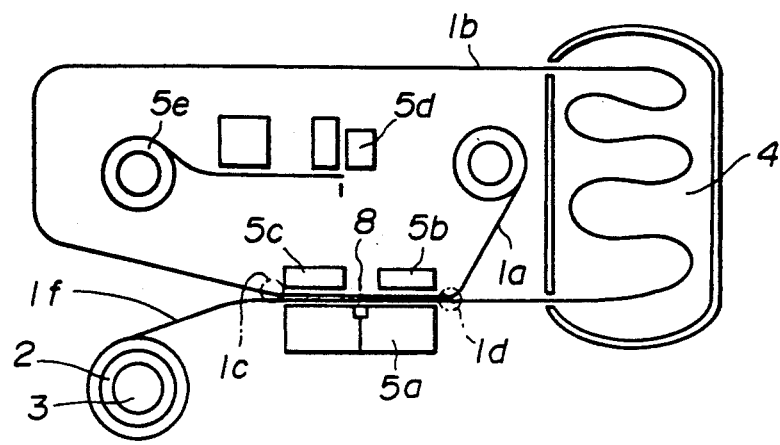

In accordance with the present invention, tape is manually drawn off the tape reel 2, passed directly over the top of the cutting/connecting section 5a, through the container 4 and looped back over the cutting/connecting section 5a to the take up reel 6. Following this set up, the automatic process is initiated and the tape reel 2 is automatically driven to rotate in the clockwise direction as seen in the drawing until a predetermined amount of tape has been fed thereoff. Under these conditions, the tape is such as illustrated in FIG. 2 and includes a superfluous portion 1a and an endless tape portion 1b which is defined between an initial portion 1c and an end portion 1d. The bulk of the tape is temporarily stored in the container 4.

As will be noted from FIG. 1 the initial and end portions 1c, 1d are located just outside of the shadows of the tape clamps 5a, 5b respectively.

Next, the tape clamps 5b, 5c are lowered and moved to positions wherein they clamp the tape on the upper surface of the connecting section 5a in a position wherein the end portion 1d of the endless tape section 1b is located immediately beside one end of the connecting section 5a and the initial portion 1c is located immediately beside the other end. As will be appreciated, the downward movement of the two tape clamps 5b, 5c grasps the tape and draws the superfluous portion 1a down so that it overlies the portion of tape which is in direct contact with the upper surface of the cutting-/connecting section 5a from the end section 1d. During this operation it is possible for tape on the take-up reel to be paid off in order to ensure that the initial portion 1c locates in the desired manner. The tape cutter 8 is then used to cut both layers of tape. During this time a length of adhesive tape is drawn off the reel 5e and fed under the adhesive applicator 5d.

The cutting of both layers of tape of course creates a new free end 1f for the tape from reel 2.

Figure 4:
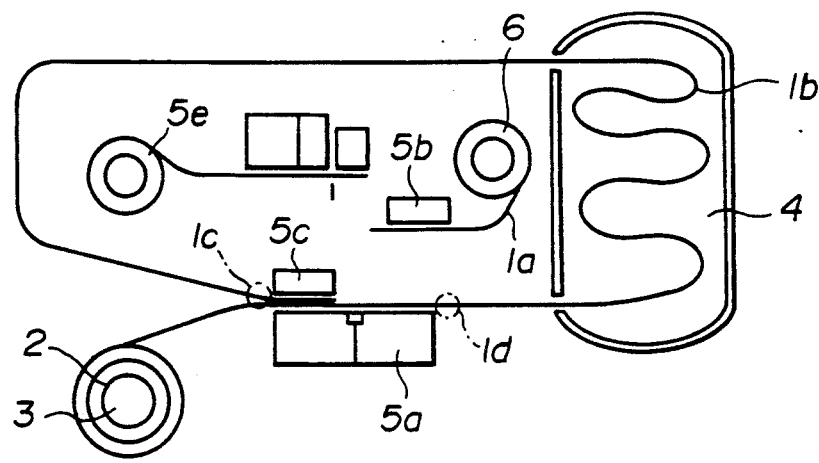
Figure 5:
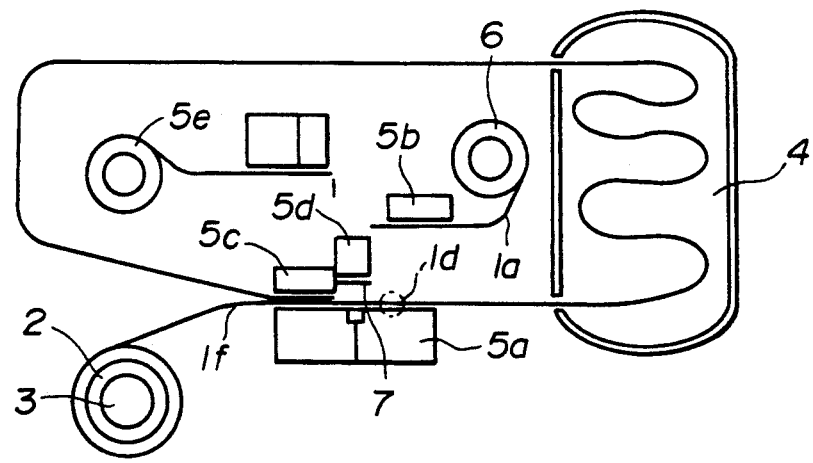

After the tape is severed, the tape clamp 5b pulls the free end of the superfluous portion 1a of the tape upwardly to the position shown in FIG. 4. The adhesive applicator 5d is then lowered in a manner which cuts off a small portion of the adhesive tape 7 and applies the same to the ends of the tape on top of the cutting connecting section 5a.

Figure 6:
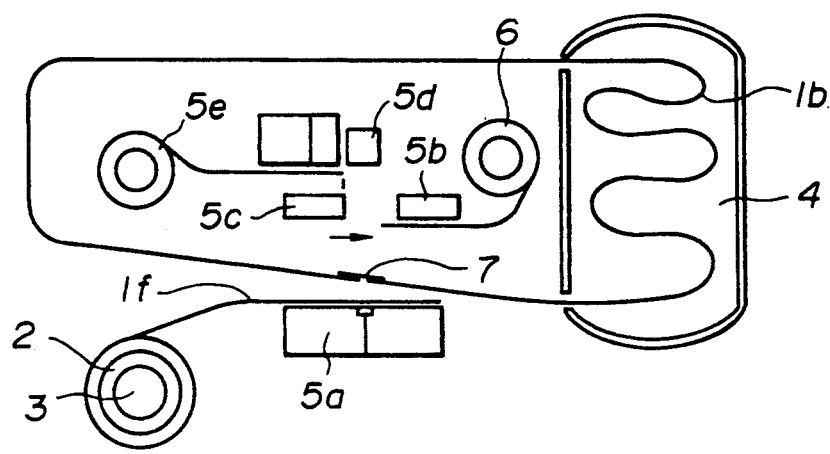

Following this, the tape clamp 5c is conditioned to release the tape and is moved upwardly. This leaves the endless tape in a completed form as shown in FIG. 6.

As will be appreciated with this process, the distance between the initial and end portions 1c, 1d of the endless tape 1b is very small. Accordingly, the length of superfluous tape is reduced to a minimum and receives the piece of adhesive tape 7.

The cutting and connecting operations are carried out automatically and thus ensure a high degree of connection precision.

It will be of course that the present invention is not limited to the exact process disclosed above and that various modifications and changes can be made without departing from the scope of the present invention which is defined by the appended claims.

What is claimed is:

1. A method of forming an endless tape comprising the steps of:
   feeding a length of tape wound on a supported tape reel, to a cutting/connecting section of a splicing device, through a container having an inlet and an outlet, and then back to the cutting/connecting section of the splicing device, so that a fed-back portion of the tape is overlaid over a trailing portion of the tape now passed over the cutting/connecting section, said length of tape including a given superfluous length and a predetermined length to be used for recording purposes, said given superfluous length and said predetermined length each being defined between respective initial and end portions thereof, said initial portion of the given superfluous length being connected to a take-up reel to be wound thereon, said end portion of the given superfluous length being adjacent the initial portion of the predetermined length, said initial and end portions of the predetermined length being located in the overlaid portions of the tape;
   securing the overlaid portion of the tape on the cutting/connecting section;
   cutting the overlaid portions of the tape on the cutting/connecting section; and
   splicing the initial and end portions of the predetermined length to define a continuous loop tape which is essentially free of the given superfluous length.

2. A method of forming an endless tape comprising:
   drawing a length of tape off a rotatably supported reel, said length of tape including a given superfluous length and a predetermined length to be used for recording purposes, said given superfluous length and said predetermined length each being defined between respective initial and end portions thereof, said end portion of the given superfluous length being adjacent the initial portion of the predetermined length;
   passing the tape over a cutting/connecting section of a splicer, through a temporary storage vessel and then back to the cutting/connecting section and connecting the initial portion of the superfluous length to a take-up reel, so that a fed-back portion of the tape is overlaid over a trailing portion of the tape now passed over the cutting/connecting section;
   winding the superfluous length on the take-up reel until the initial portion of the predetermined length is fed to immediately proximate the cutting/connecting section, while feeding the tape on the rotatably supported reel to the temporary storage vessel until the end portion of the predetermined length is fed to the cutting/connecting section;
   stopping winding of the superfluous length on the take-up reel and terminating feeding of the tape to the temporary storage vessel so that the overlaid portions of the tape include the initial and end portions of the predetermined length;
   clamping the overlaid portions of the tape on the cutting/connecting section using first and second tape clamps and cutting the same using a cutter; and
   withdrawing one of the first and second tape clamps and applying a piece of adhesive tape in a manner which splices the initial and end portions of the predetermined length to form a continuous loop tape.

* * * * *